United States Patent
Jääskeläinen et al.

(10) Patent No.: US 7,561,771 B2
(45) Date of Patent: Jul. 14, 2009

(54) METHOD FOR INSTALLING A DOUBLE ENDED DISTRIBUTED SENSING FIBER OPTICAL ASSEMBLY WITHIN A GUIDE CONDUIT

(75) Inventors: Kari-Miko Jääskeläinen, Rijswijk (NL); Alexander Michael Van Der Spek, Rotterdam (NL)

(73) Assignee: Shell Oil Company, Houston, CA (US)

( * ) Notice: Subject to any disclaimer, the term of this patent is extended or adjusted under 35 U.S.C. 154(b) by 445 days.

(21) Appl. No.: 10/567,637

(22) PCT Filed: Jul. 26, 2004

(86) PCT No.: PCT/EP2004/051602

§ 371 (c)(1),
(2), (4) Date: Feb. 8, 2006

(87) PCT Pub. No.: WO2005/014976

PCT Pub. Date: Feb. 17, 2005

(65) Prior Publication Data

US 2007/0110355 A1    May 17, 2007

(30) Foreign Application Priority Data

Aug. 11, 2003    (EP)    ................... 03077544

(51) Int. Cl.
*G02B 6/44*    (2006.01)
(52) U.S. Cl. .................. 385/100; 385/109; 385/110; 385/111; 385/112

(58) Field of Classification Search .............. 385/100, 385/109–112
See application file for complete search history.

(56) References Cited

U.S. PATENT DOCUMENTS

| 5,138,676 A | 8/1992 | Stowe et al. ............ 385/32 |
| 5,416,779 A | 5/1995 | Barnes et al. .......... 370/29.1 |
| 6,644,402 B1 * | 11/2003 | Sharma et al. ...... 166/250.01 |

FOREIGN PATENT DOCUMENTS

| EP | 0424120 | 4/1991 |
| EP | 1255022 | 11/2002 |

(Continued)

OTHER PUBLICATIONS

International Search Report dated Sep. 22, 2004 (PCT/EP2004/051602).

*Primary Examiner*—Frank G Font
*Assistant Examiner*—Jerry Blevins

(57) ABSTRACT

A method of installing a double ended distributed sensing optical fiber assembly within a guide conduit. The optical fiber sensing assembly has a first elongate section with a first proximal end and a first distal end, and a second elongate section with a second proximal end and a second distal end. The method includes providing a nose section having an outer width less than about 1 cm, which interconnects the first proximal end to the second proximal end such that light transmitted along the length of the first elongate section is transmitted via the nose section into the second elongate section, inserting the nose section into the guide conduit such that the nose section moves through the guide conduit ahead of the first elongate section and the second elongate section; and connecting the first distal end and the second distal end to a light transmission and receiving unit.

19 Claims, 2 Drawing Sheets

FOREIGN PATENT DOCUMENTS

| | | |
|---|---|---|
| EP | 1357401 | 10/2003 |
| EP | 1357402 | 10/2003 |
| EP | 1357403 | 10/2003 |
| JP | 2001 124529 | 5/2001 |
| JP | 2001 125529 | 5/2001 |
| WO | 00/49273 | 8/2000 |

* cited by examiner

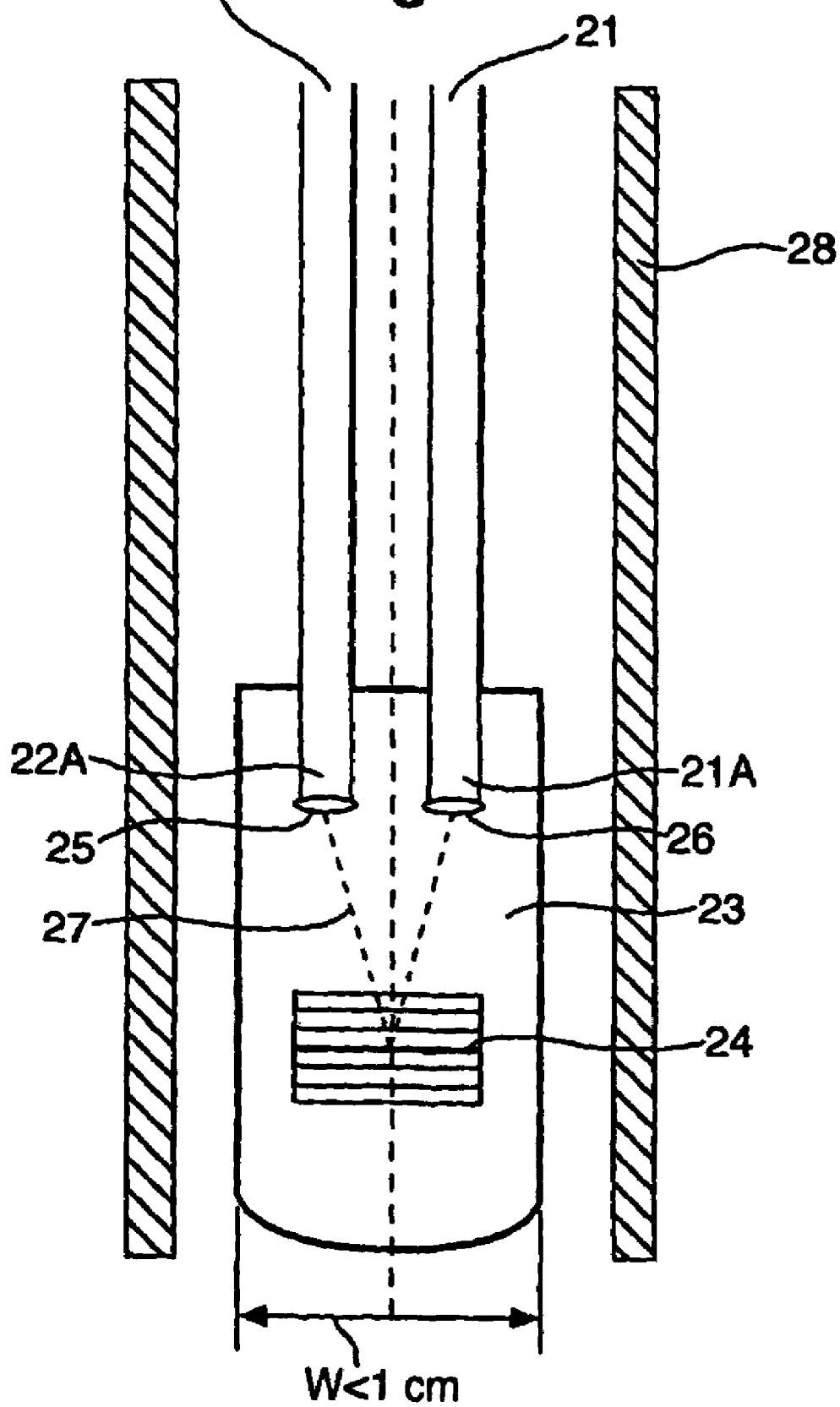

METHOD FOR INSTALLING A DOUBLE ENDED DISTRIBUTED SENSING FIBER OPTICAL ASSEMBLY WITHIN A GUIDE CONDUIT

PRIORITY CLAIM

The present application claims priority on European Patent Application 03077544.9 filed Aug. 11, 2003.

FIELD OF THE INVENTION

The invention relates to a method of installing a double ended distributed optical fiber assembly within a guide conduit.

BACKGROUND OF THE INVENTION

Such a method is known from European patent application EP 0424120, Japanese patent application JP 2001124529A and from International patent application WO 00/49273.

In the method known from Japanese patent application JP 2001125529A a distributed strain and displacement sensing fiber optical cable is bent into a U-shape and lowered into a underground borehole by means of a weight suspended from the U-folded nose section of the optical fiber.

In the method known from International patent application WO 00/49273 a U-folded distributed temperature sensing fiber optical cable is inserted into a coiled tubing within an underground borehole by connecting the U-folded mid-section of the fiber optical cable to a plug which is bull headed by pumping fluid though the tubing to carry the plug and the fiber optical cable to the bottom of the well.

The known U-shaped, double ended, distributed sensing fiber optical assemblies are inserted into guide conduits that are formed by a well casing and coiled well tubing having an internal width which is typically several centimeters and they are not configured to be installed in small diameter guide conduits.

SUMMARY OF THE INVENTION

The method according to the invention for installing a double ended distributed sensing optical fiber assembly within a guide conduit, the method comprising:

providing a nose section, which interconnects the hint proximal ends to the second proximal end of such that light transmitted along the length of is transmitted via the nose section into the other section of fiber optical cable;

inserting the nose section into the guide conduit such that the nose section moves through the guide conduit ahead of the first elongate section and second elongate section; and connecting the first distal ends and second distal end to a light transmission and receiving unit;

wherein the nose section has an outer width (W) which is less than 1 cm the nose section and the first elongate section and second elongate section are formed from a single fiber optical cable, which is bent into a U-shaped configuration in a region of the nose section and the fiber optical cable is stretched in the region of the nose section such that the fiber optical cable has a smaller width in the region of the nose section than in most other parts of the fiber optical cable.

The invention also relates to a method of producing oil and/or gas, wherein the temperature and/or pressure of fluids flowing through at least part of an inflow region of an oil and/or gas production well is monitored by a double ended distributed sensing fiber optical assembly which is installed in accordance with the method according to the present invention.

BRIEF DESCRIPTION OF THE DRAWINGS

Several non-limitative embodiments of the method according to the invention will be described in more detail and by way of example with reference to the accompanying drawings, in which:

FIG. 2 depicts a guide conduit which contains a double ended distributed sensing fiber optical cable assembly that has a nose section in which light emitted from one fiber optical cable section is reflected into another fiber optical cable section.

DETAILED DESCRIPTION OF THE INVENTION

Figure 1:
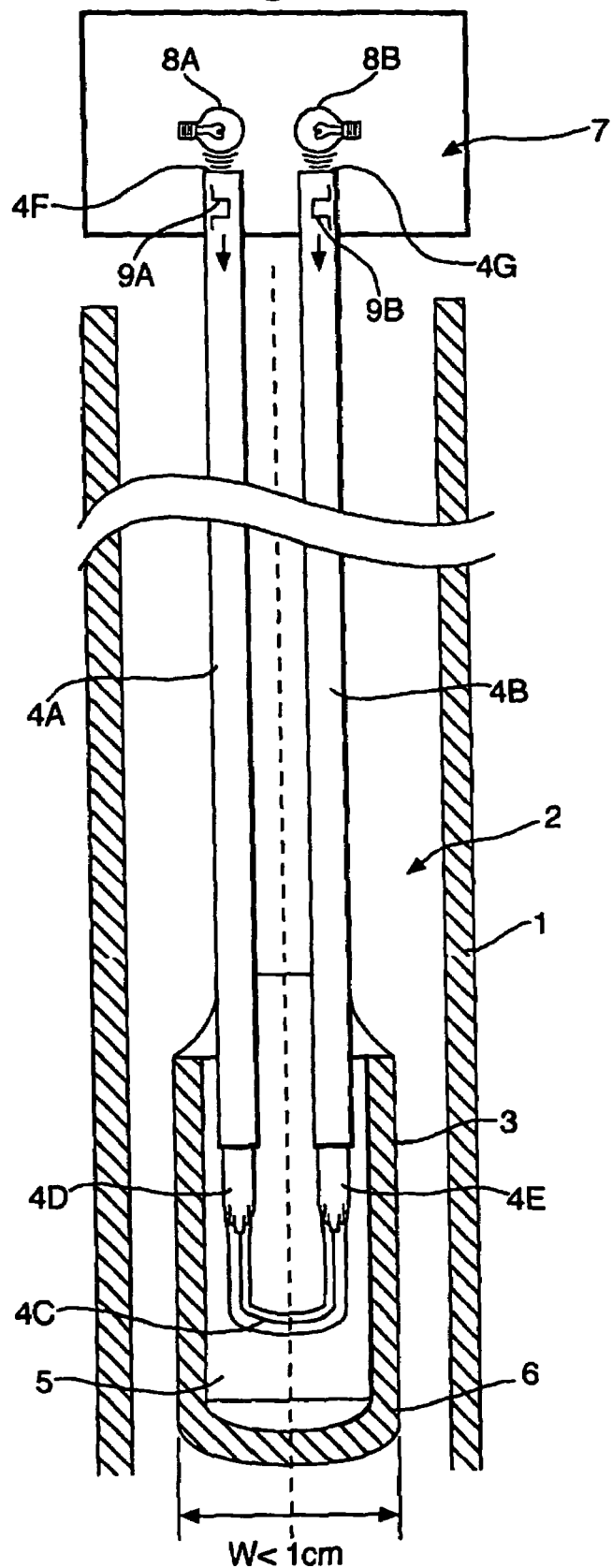
FIG. 1 depicts a guide conduit which contains a double ended distributed sensing fiber optical cable assembly that has a nose section in which a U-folded section of the optical fiber is embedded.

FIG. 1 depicts an elongate guide conduit 1, which contains a double ended fiber optical sensing assembly 2 having a nose section 3 in which a U-folded nose portion 4C of an optical fiber is embedded. The U-folded nose portion 4C interconnects two elongate sections 4A and 4B of the optical fiber. The U-folded nose portion 4C is heated to a temperature above 1000 degrees Celsius and stretched during the bending process, whereupon the red-hot bent U-folded nose portion is embedded in a body 5 of material having a lower index of reflection than the U-folded nose portion 4C of the optical fiber 4, thereby creating optical continuity in the U-folded nose portion 4C. One suitable method for bending a fiber optical cable into a U-shaped configuration is disclosed in U.S. Pat. No. 5,138,676. The nose section 3 comprises an impact resistant outer coating 6 and has a generally cylindrical shape. The outer width of the nose section 3 has an outer width W which is less than 1 cm. In a preferred embodiment the method of the present invention the guide conduit 1 has an internal width less than 1 cm and the nose section 3 has an outer width less than 5 mm. In a particularly preferred embodiment of the method according to the invention the guide conduit 1 has an internal width less than 5 mm and the nose section 3 has an outer width W less than 3 mm. The small internal and external width of the guide conduit 1 generate a distributed sensing assembly which is compact and non-intrusive and which can be easily inserted into narrow passageways, such as hydraulic power and control conduits, in an underground well for the production of oil and/or gas.

The elongate sections 4A and 4B of the fiber optical cable 4 comprise a pair of proximal ends 4D and 4E that are interconnected by the U-shaped nose portion 4C and a pair of distal ends 4F and 4G. Each distal end 4F and 4G provides an end of the double ended distributed sensing optical fiber assembly 2. Each distal end 4F and 4G may be connected to a light pulse generation and receiving unit 7 which is equipped with two light sources 8A and/or 8B, which are configured to transmit alternatingly pulsed or simultaneously pulsed and continuous wave laser light signals 9A and 9B into the elongate sections 4A and 4B of the fiber optical cable. The unit 7 also provides a reference chamber in which the upper parts of the elongate sections 4A and 4B are exposed to a known temperature and/or pressure. By using a double ended fiber optical temperature and/or pressure sensing assembly 2 light pulses 9A and 9B can be directed in both ways though the assembly, which enables to compensate for any attenuation of the light pulses 9A and 9B as they travel along the length of the fiber optical cable 4 and which eliminates the need for the use of a downhole pressure and/or temperature reference sensor, which is required for the conventional single ended distributed pressure and/or temperature sensing (DPS/DTS) fiber optical assemblies.

FIG. 2 depicts an alternative embodiment of the method according to the invention, wherein the proximal ends 21A and 22A of two distributed sensing (DPS and/or DTS) fiber optical cables 21 and 22 are interconnected by a nose section 23 which comprises a mirror 24 and lenses 25 and 26, which reflect light from the first fiber optical cable 21 into the second fiber optical cable 22 and vice versa as illustrated by the dotted lines 27. The proximal ends of the fiber optical cables 21 and 22 are encapsulated within the nose section 23, which has an outer width W less than 1 cm, preferably less than 5 mm. The nose section is suspended within a guide conduit 28 having an internal diameter, which is less than 2 cm, preferably less than 1 cm.

The two sections of the double ended fiber optical cable 4 may be arranged parallel to each other in a side by side arrangement within in a protective stainless steel tube which preferably has an outer diameter (OD) from 1 to 3 mm, and which tube is connected to a protective end cap in which the nose section 3 is arranged. The end cap may have spacers to guide the end cap through the guide conduit 1 and to provide additional drag/fluid resistance during insertion of the protective stainless steel tube containing the sensing assembly 2 into the guide conduit 1.

Optionally, the protective stainless steel tube houses a plurality of fiber optical sensing assemblies 2, which sensing assemblies 2 monitor different physical parameters such as pressure, temperature, acoustic data, and which assemblies 2 are connected to flow, pressure, temperature, acoustic and/or seismic data monitoring systems.

The use of a stainless steel tube protects the fiber optical sensor assembly 2 or assemblies against mechanical damage and exposure to water and chemicals that may degrade the optical fiber or fibers 4. This allows use of a lower cost optical fiber 4. The fiber 4 may be:

(A) a low cost fiber with acrylate coating for operation up to 85° C. while maintaining design reliability or increasing reliability;

(B) a fiber with a high temperature coating, such as polyamide, which allows operation to 250-300° C.;

(c) a fiber with a metal coating which allows operation to 650-750° C.

The protective stainless steel tube may be filled with air or a substance that inhibits chemical degradation and/or corrosion of the fiber optical cable 4 while taking into account the thermal expansion difference of the materials and the substance in the metal tube.

The 1-3 mm OD protective stainless steel tube may be arranged within a larger OD stainless steel tube such as a ¼" (6 mm OD) control line. This provides additional mechanical and chemical protection as well as allows for mechanical support to the sensor housings for the additional sensors.

A ¼" (6 mm OD) control line is a standard size control line for oil and/or gas production wells and allows for use of existing well packers and penetrations. The ¼" (6 mm OD) control line also allows for innovative packer feed through with swell packers without the need for cutting the cable. This simplifies the operation while avoiding splicing in the field and minimizes the number of fiber optic connectors and minimizes the complexity of the installation. This ¼" (6 mm OD) control line, with or without additional sensor housings, may be strapped to the tubing of the oil and/or gas production well or otherwise inserted into the desired environment.

If the fiber 2 is pumped into the guide conduit 1 then a U-shaped guide conduit may be used, or the guide conduit 1 may have a substantially straight shape and at a lower end thereof be equipped with a check valve, such that when the double ended fiber optical sensor assembly 2 is pumped into the guide conduit 1 the pump fluid is discharged from the guide conduit 1 through the check valve into a the bottom section of a well or into conduits shared by other systems such as hydraulic control lines for hydraulic sleeves.

The optical fiber assembly 2 may be inserted into a guide conduit 1 which extends into a subsea well by pumping the assembly 2 into the guide conduit 1 by means of a remotely operated subsea pod, which may be removably mounted on a subsea wellhead by a remotely operated vehicle (ROV).

The fiber optical cable is heated when it is stretched and the bent section of stretched fiber optical cable is embedded in a nose-shaped body of material having a lower light reflection index than the stretched fiber optical cable embedded therein and that said nose shaped body has a substantially cylindrical shape and an outer diameter less than 3 mm. A suitable method for bending a fiber optical cable into a U-shaped configuration is disclosed in U.S. Pat. No. 5,138,676.

In an alternative embodiment of the method according to the invention the two sections of distributed sensing fiber optical cable are interconnected by a nose section which comprises a light reflecting element, such as a mirror, which is configured to transmit light emitted from a proximal end of one section of distributed sensing fiber optical cable into a proximal end of the other section of distributed sensing fiber optical cable.

In some embodiments of the method according to the invention it is preferred that the light transmitting and receiving unit is configured to transmit light pulses alternatingly into each distal end of each of said two sections of distributed sensing fiber optical cable and to acquire distributed sensing data from light backscattered from different points along the length of the fiber optical cables to the distal end into which the light pulses are transmitted.

The distributed sensing fiber optical assembly installed by the method according to the invention may be configured as a distributed temperature and/or distributed pressure sensor assembly, and each section of distributed sensing fiber optical cable may pass through a reference region in which the fiber optical cable is exposed to a known temperature and/or hydraulic pressure. In such case said reference region may be formed by a chamber in which the temperature and pressure are monitored, in which chamber a selected length of each section of distributed sensing optical fiber is coiled.

Suitably, the nose section and at least a substantial part of the distributed sensing fiber optical cables interconnected thereby are inserted into the guide conduit by pumping a fluid from one end towards another end of the guide conduit.

The guide conduit may be installed within or in the vicinity of an elongate fluid transfer flowline, such as an underground inflow region of an oil and/or gas production well.

We claim:

1. A method of installing a double ended distributed sensing optical fiber assembly within a guide conduit, the method comprising:
   providing a distributed sensing optical fiber assembly having a first elongate section with a first proximal end and a first distal end, and second elongate section with a second proximal end and a second distal end;
   providing a nose section, which interconnects the first proximal end to the second proximal end such that light transmitted along the length of one section of fiber optical cable is transmitted via the nose section into the other section of fiber optical cable;

inserting the nose section into the guide conduit such that the nose section moves through the guide conduit ahead of the first elongate section and second elongate section; and connecting the first distal end and second distal end to a light transmission and receiving unit;

wherein the nose section has an outer width which is less than 1 cm and the nose section, the first elongate section, and the second elongate section are formed from a single fiber optical cable that which is bent into a U-shaped configuration in a region of the nose section and the fiber optical cable is stretched in the region of the nose section such that the fiber optical cable has a smaller width in the region of the nose section than in most other parts of the fiber optical cable; and wherein the fiber optical cable is heated when it is stretched and the bent section of stretched fiber optical cable is embedded in a nose-shaped body of material having a lower light reflection index than the stretched fiber optical cable embedded therein.

2. The method of claim 1, wherein the nose section has an outer width which is less than about 5 mm and the guide conduit has an internal width which is less than about 10 mm.

3. The method of claim 1, wherein said nose shaped body has a substantially cylindrical shape and an outer diameter less than 3 mm.

4. The method of claim 1, wherein the nose section and at least a substantial part of the distributed sensing fiber optical cables interconnected thereby are inserted into the guide conduit by pumping a fluid from one end towards another end of the guide conduit.

5. The method of claim 1, wherein the guide conduit is installed within or in the vicinity of an elongate fluid transfer flowline.

6. The method of claim 5, wherein the fluid transfer flowline is an underground inflow region of an oil or gas production well.

7. The method of claim 6, wherein the temperature or pressure of fluids flowing through at least part of an inflow region of an oil or gas production well are monitored by a distributed sensing fiber optical assembly and the method is used to monitor and/or control the production of oil or gas.

8. The method of claim 1, wherein at least substantial parts of the first elongate section and second elongate section are arranged side by side in a protective stainless steel tube having an outer diameter outer diameter from about 1 to about 3 mm, which tube is connected to a protective end cap in which the nose section is arranged and which tube is inserted into the guide conduit.

9. The method of claim 8, wherein a plurality of fiber optical sensing assemblies extend side by side through the protective stainless tube, which sensing assemblies monitor pressure, temperature or acoustic data and which are coupled to a series of flow, pressure, temperature, acoustic or seismic data monitoring assemblies.

10. The method of claim 8, wherein the protective stainless steel tube is arranged within a larger outer diameter stainless steel tube.

11. The method of claim 1, wherein at least substantial parts of the first elongate section and second elongate section are arranged side by side in a jacketed flexible protective tube, which is provided with a moulded end cap in which the nose section is arranged.

12. The method of claim 1, wherein the guide conduit has a substantially straight shape and is at a lower end thereof equipped with a check valve, such that when the double ended fiber and nose section are pumped into the guide conduit the pump fluid is discharged from the guide conduit through the check valve.

13. The method of claim 1, wherein the optical fiber assembly is inserted into the guide conduit which extends into a subsea well by means of a remotely operated subsea pod, which is removably mounted on a subsea wellhead.

14. The method of claim 1, wherein the guide tube is formed by the casing of an oil or gas production well and the double ended distributed sensing optical fiber assembly is strapped to the production tubing of the oil or gas production well, or otherwise inserted into the well.

15. A method of installing a double ended distributed sensing optical fiber assembly within a guide conduit, the method comprising:

providing a distributed sensing optical fiber assembly having a first elongate section with a first proximal end and a first distal end, and second elongate section with a second proximal end and a second distal end;

providing a nose section, which interconnects the first proximal end to the second proximal end such that light transmitted along the length of one section of fiber optical cable is transmitted via the nose section into the other section of fiber optical cable;

inserting the nose section into the guide conduit such that the nose section moves through the guide conduit ahead of the first elongate section and second elongate section; and connecting the first distal end and second distal end to a light transmission and receiving unit;

wherein the nose section has an outer width which is less than 1 cm and the nose section, the first elongate section, and the second elongate section are formed from a single fiber optical cable that which is bent into a U-shaped configuration in a region of the nose section and the fiber optical cable is stretched in the region of the nose section such that the fiber optical cable has a smaller width in the region of the nose section than in most other parts of the fiber optical cable; and wherein the light transmitting and receiving unit is configured to transmit light pulses or pulsed and continuous waves alternatingly or simultaneously into the first distal end and the second distal end and to acquire distributed sensing data from light backscattered from different points along the length of the first elongate section and the second elongate section to the distal end into which the light pulses are transmitted.

16. The method of claim 15, wherein the distributed sensing fiber optical assembly is configured as a distributed temperature sensor assembly, and wherein each section of distributed sensing fiber optical cable passes through a reference region in which the fiber optical cable is exposed to a known temperature.

17. The method of claim 16, wherein said reference region is formed by a chamber in which the temperature is monitored, in which chamber a selected length of each section of distributed sensing optical fiber is coiled.

18. A method of installing a double ended distributed sensing optical fiber assembly within a guide conduit, the method comprising:

providing a distributed sensing optical fiber assembly having a first elongate section with a first proximal end and a first distal end, and second elongate section with a second proximal end and a second distal end;

providing a nose section, which interconnects the first proximal end to the second proximal end such that light transmitted along the length of one section of fiber optical cable is transmitted via the nose section into the other section of fiber optical cable;

inserting the nose section into the guide conduit such that the nose section moves through the guide conduit ahead of the first elongate section and second elongate section; and connecting the first distal end and second distal end to a light transmission and receiving unit;

wherein the nose section has an outer width which is less than 1 cm and the nose section, the first elongate section, and the second elongate section are formed from a single fiber optical cable that which is bent into a U-shaped configuration in a region of the nose section and the fiber optical cable is stretched in the region of the nose section such that the fiber optical cable has a smaller width in the region of the nose section than in most other parts of the fiber optical cable; and wherein the distributed sensing fiber optical assembly is configured as a distributed pressure sensor assembly; wherein each section of distributed sensing fiber optical cable passes through a reference region in which the fiber optical cable is exposed to a known hydraulic pressure.

19. The method of claim 18, wherein the reference region is formed by a chamber in which the pressure is monitored, in which chamber a selected length of each section of distributed sensing optical fiber is coiled.

* * * * *